ULTRAHIGH INPUT IMPEDANCE CIRCUIT
Filed May 13, 1965
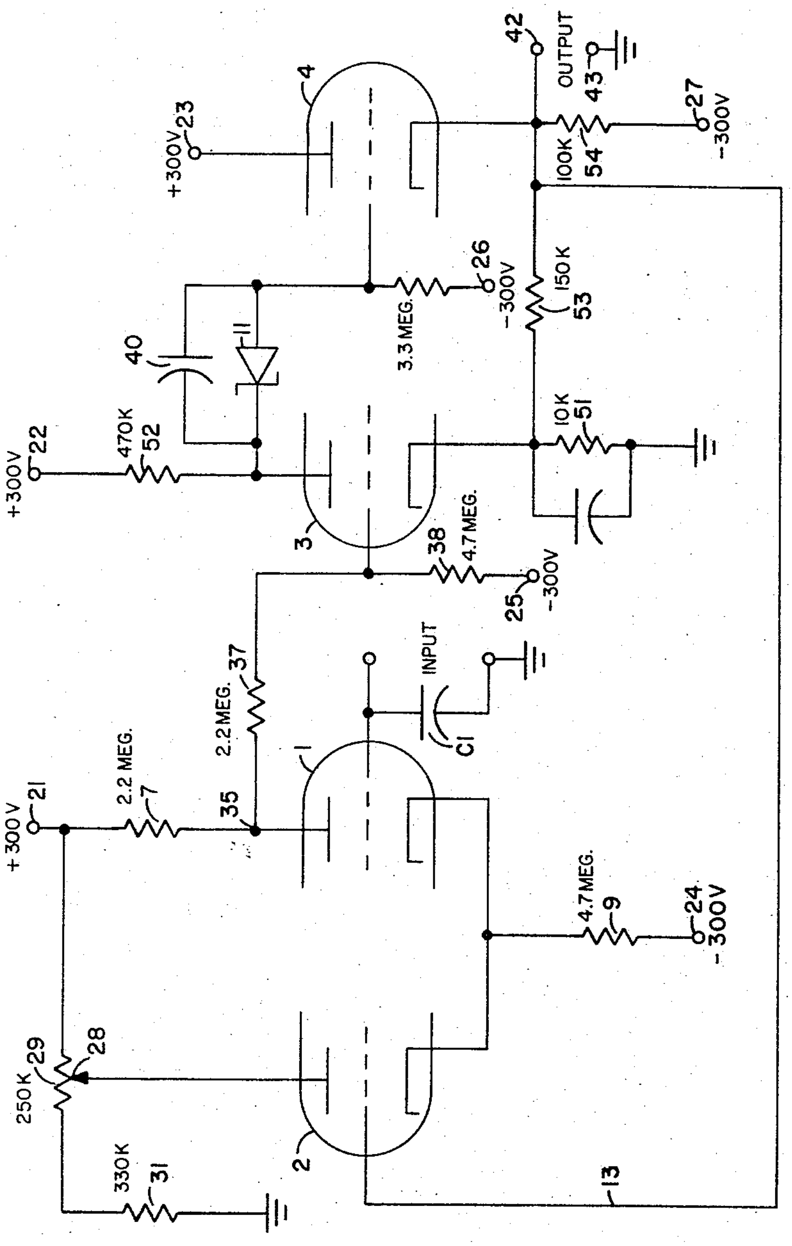
Richard H. Daly,
INVENTOR.
Harry M. Saragovitz
BY Edward J. Kelly
Herbert Berl
Robert C. Sims 3,363,192

ULTRAHIGH INPUT IMPEDANCE CIRCUIT

Richard H. Daly, Framingham, Mass., assignor, by mesne assignments, to the United States of America as represented by the Secretary of the Army Filed May 13, 1965, Ser. No. 455,663
10 Claims. (Cl. 330—69)

ABSTRACT OF THE DISCLOSURE

A first triode with an input voltage connected to its grid, wherein the input voltage causes a variation of the plate voltage of the tube. The variations of plate voltage are amplified by an amplifier. Part of the output voltage from the amplifier is fed to a second triode whose cathode is connected to the cathode of the first triode and thereby controls the voltage of the cathode of the first triode so that it approaches the voltage of the input thereby maintaining substantially a constant high input impedance.

This invention relates broadly to a unique amplifier circuit configuration which has an input impedance in the neighborhood of $10^{12}$ ohms (1 million megohms). More particularly, this invention is related to a high input impedance amplifier circuit which is capable of maintaining an ultrahigh input impedance over the wide range of environmental conditions encountered in miiltary field use.

Circuits are to be used to memorize or store D.C. analog voltages, do so by placing a low leakage capacitor between a grid of a tube and ground. It has been a problem to keep the capacitor from discharging too fast through the grid of the tube. The solution to this problem is to make the impedance through the grid path very high and the voltage difference very low. However, since this is the grid of an amplifier circuit, many other problems occur and are created by making the grid path of a high impedance. In the past, such circuits required the use of floating power supplies, only positive signal excursions, and a gain of at most only (one).

There is a need to provide an ultrahigh input amplifier with an overall input impedance of $10^{12}$ ohms which can be mass produced. This is an extremely hard task when one realizes that the leakage paths of ordinary insulators are in the order of magnitude of $10^9$ ohms. A circuit with an overall input impedance of $10^{12}$ ohms, therefore, represents a big jump in advancing the state of the art in producing high impedance circuits.

It is an object of this invention to provide a circuit which has an ultra high input impedance.

It is a further object of the present invention to provide an amplifier circuit which has an input impedance in the order of magnitude of $10^{12}$ ohms.

A still further object of the invention is to provide a high input impedance amplifier circuit which is capable of maintaining an ultrahigh input impedance over the wide range of environmental conditions encountered in military field use.

The invention further resides in and is characterized by various novel features of construction, combinations, and arrangements of parts which are pointed out with particularity in the claims annexed to and forming a part of this specification. Complete understanding of the invention and an introduction to other objects and features, not specifically menitoned, will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein the single figure shows a schematic diagram illustration a preferred form of the invention.

A capacitor C1 is provided to memorize or store D.C. analog voltages from the input terminals. Once the charging signal from the input terminals is removed, capacitor C1 discharge is governed by the input impedance of the amplifier tube 1. This discharge is, of course, not wanted, and the minimizing of this discharge is what the invention is about. The input terminals of the amplifier are between the grid of tube 1 and ground. The input impedance of tube 1 is maximized by minimizing grid current in the first stage. The grid current of tube 1 is minimized in three ways: first, by the choice of a proper tube; second, by starvation current operation of the first stage; and third, by bias stabilization of the first stage.

The tubes 1 through 4 of this circuit are all of the type which are designed to have an unusually low and controlled grid current. The plate current through tube 1 is limited to about 70 microamperes by large plate and cathode resistors 7 and 9, both of which have an impedance over $10^6$ ohms. The resistors, such as resistors 51 through 54, all have the value in ohms as indicated in the drawing. The use of large resistors 7 and 9 in the plate circuit is called "plate current starvation." The overall circuit gain, on an open loop basis, is very high. A Zener diode 11 and capacitor 40 are used to maintain a fixed D.C. bias and to provide a high A.C. gain. A neon bulb or the like could be used in place of diode 11.

In order to hold the loop gain very close to 1, a 100% feedback is applied between the output and the grid of tube 2 by way of line 13. Due to the connection of resistor 9, the cathode voltage of tube 1 is controlled by both grids of amplifier tubes 1 and 2. Due to the nature of the feedback path, tube 2 and the commonly connected cathodes of tubes 1 and 2 tend to track the grid of tube 1. Hence, once a favorable operating bias point of low grid current is selected for tube 1, the feedback circuit tends to maintain this bias constant over wide operating ranges. This circuit is able to present an essentially constant value of high input impedance over a 100 volts change in input at tube 1. A further feedback from tube 3 is had through resistor 53.

A negative grounded source of D.C. voltage is applied to the terminals 24 through 27, and a positive grounded source is connected to terminals 21 through 23. Zero adjustment is made by adjusting tap 28 on resistor 29. Resistor 31 provides the proper voltage drop to ground. Due to the ground connections, the input voltage may be of either polarity with respect to ground. The voltage change of junction 35 will follow the input to the grid of tube 1. This, in turn, causes the voltage change at the input of the grid of tube 3 to follow the input to tube 1. Resistors 37 and 38 provide the proper voltage ratio. The input is amplified by tube 3 and sent to the grid of tube 4 by way of Zener diode 11 and capacitor 40. Tube 4 further amplifies the signal and sends it to output terminals 42 and 43. This output is fed back to tube 2 by line 13 in order to make the voltage of the cathode of tube 1 very nearly equal to the voltage of the input to its grid. This is, of course, a 100% feedback on line 13.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is therefore to be understood that within the scope of the appended claims the invention may be practiced otherwise than as specifically described. Accordingly, it is desired that the scope of the invention be limited only by the appended claims.

I claim:

1. A high input impedance circuit comprising: a first and second controlled device each having at least three electrodes; a first and second input terminal; input means connected between said first and second input terminals; said input terminal being connected to a first electrode of said first controlled device; first, second and third biasing voltage terminals; a first impedance means connecting said first biasing voltage terminal to a second electrode of said first controlled device; a tapped impedance means having its ends connected between said first and third biasing voltage terminals; a second electrode of said second controlled device being connected to a tapped connection on said tapped impedance means; a second impedance means connecting a third electrode of said first and second controlled devices to said second biasing voltage terminal; an amplifier having its input connected to said second electrode of said first controlled device; and a feedback connecting between the output of said amplifier and the first electrode of said second controlled device.

2. A network as set forth in claim 1, wherein said first and second controlled devices are electron tubes in which said first, second, and third electrodes are the grid, plate, and cathode, respectively.

3. A network as set forth in claim 2, wherein said tapped impedance means is adjusted so that the cathodes of the tubes will have a voltage which will follow the voltage connected to the input terminal because of the feedback connection.

4. A network as set forth in claim 3, wherein said first and second impedance means are resistors which each have more than a million ohms in impedance.

5. A network as set forth in claim 1, wherein said amplifier has first and second stages; said feedback connection is further connected to said first stage of said amplifier; said input of said amplifier is connected to said second electrode of said first controlled device through a third impedance means; said input is further connected through a fourth impedance means to said second biasing voltage terminal; the output of said first stage is connected to an input of said second stage by way of a Zener diode and a capacitor connected in parallel to each other.

6. A network as set forth in claim 5, wherein said first and second controlled devices are tubes in which said first, second, and third electrodes are the grid, plate, and cathode, respectively.

7. A network as set forth in claim 6, wherein said tapped impedance means is adjusted so that the cathodes of the tubes will have a voltage which will follow the voltage connected to the input terminal because of the feedback connection.

8. A network as set forth in claim 7, wherein said first, second, third and fourth impedance means are resistors which each have more than a million ohms in impedance.

9. A network as set forth in claim 8 wherein said first, second, and third biasing voltage terminals are connected to a positive potential, a negative potential, and ground, respectively.

10. A network as set forth in claim 9 wherein said input means is a capacitor.

References Cited

UNITED STATES PATENTS

| | | | |
|---|---|---|---|
| 2,796,468 | 6/1957 | McDonald | 330—69 |
| 2,903,522 | 9/1959 | Flower | 330—28 |
| 2,927,165 | 3/1960 | Fairstein | 330—97 X |
| 2,965,850 | 12/1960 | Jameson | 330—69 X |
| 3,109,930 | 11/1963 | Macdonald | 328—127 X |

OTHER REFERENCES

Valley et al.: Vacuum Tube Amplifiers, McGraw-Hill, N.Y., 1948, pp. 477–479.

Volkers: "Direct Coupled Amplifier Starvation Circuits," Electronics, March 1951, pp. 126–129.

ROY LAKE, *Primary Examiner.*

J. B. MULLINS, *Assistant Examiner.*